UNITED STATES PATENT OFFICE.

MICHAEL MANN, OF SYRACUSE, NEW YORK.

IMPROVED ARTIFICIAL FUEL.

Specification forming part of Letters Patent No. 35,427, dated May 27, 1862.

*To all whom it may concern:*

Be it known that I, MICHAEL MANN, of the city of Syracuse, in the county of Onondaga and State of New York, have invented a new and useful process for making coal-dust available for fuel; and I do hereby declare that the following is a full and exact description of the process and the different ingredients used.

The nature of my invention consists in mixing to one ton of coal-dust, (after preparing,) twenty-five pounds of flour, fifty pounds of coal-tar or wood-tar, fifty pounds of pitch, rosin, asphaltum, or petroleum, fifty pounds of plaster, five pounds of clay, and one hundred gallons of water, or sufficient quantity to make the whole of the proper consistency.

To enable others skilled in the art to make and use my invention I will proceed to describe the process of making it.

Take the twenty-five pounds of flour and add to it fifty gallons of water. Put both in a kettle over a fire and let it remain until the water boils, stirring it during the time. Then add the fifty pounds of coal-tar or wood-tar, the whole remaining over the fire, and stirring it until the coal-tar or wood-tar has become diffused throughout the whole. Then add fifty pounds of pitch, rosin, asphaltum, or petroleum, as may be thought best. Continue stirring the whole until the last ingredient added has become melted and diffused through the whole. Take another kettle, put it over a fire, and in fifty gallons of water add to that fifty pounds of plaster, or same amount of clay and plaster together, and stir it until the water boils. Then from this kettle add to the other kettle of ingredients sufficient to make the whole of the desired consistency. Then add it to the coal-dust, and mix it all together until it assumes the consistency of common mortar. The quantity of these several ingredients may be increased or diminished without effecting the result, but will effect the quality of the fuel thus produced. Then let the compound dry, and it is in a condition to use for fuel.

What I claim as my invention, and desire to secure by Letters Patent, is—

The composition composed of the ingredients combined as described and in about the proportions, for the purpose set forth, the same constituting an improved, new, and useful article of manufacture.

MICHAEL MANN.

Witnesses:
L. F. SMITH,
J. HUNT.